US011861243B1

(12) United States Patent
Li

(10) Patent No.: US 11,861,243 B1
(45) Date of Patent: Jan. 2, 2024

(54) COMPUTER-IMPLEMENTED METHOD FOR GENERATING A DECORATIVE PATTERN FOR DECORATIVE PANELS, AND MANUFACTURING METHOD OF SUCH PANELS

(71) Applicant: Northann Building Solutions LLC, Elk Grove, CA (US)

(72) Inventor: Lin Li, Elk Grove, CA (US)

(73) Assignee: Northann Building Solutions LLC, Elk Grove, CA (US)

( * ) Notice: Subject to any disclaimer, the term of this patent is extended or adjusted under 35 U.S.C. 154(b) by 0 days.

(21) Appl. No.: 17/890,797

(22) Filed: Aug. 18, 2022

(30) Foreign Application Priority Data

Aug. 9, 2022 (NL) ...................................... 2032705

(51) Int. Cl.
*G06F 3/12* (2006.01)
*G06T 7/11* (2017.01)
(Continued)

(52) U.S. Cl.
CPC .......... *G06F 3/1208* (2013.01); *G06F 3/0482* (2013.01); *G06F 3/1204* (2013.01); *G06F 3/1254* (2013.01); *G06F 3/1256* (2013.01); *G06T 7/11* (2017.01); *G06T 7/30* (2017.01); *G06T 2200/24* (2013.01);
(Continued)

(58) Field of Classification Search
None
See application file for complete search history.

(56) References Cited

U.S. PATENT DOCUMENTS 3,173,804 A 3/1965 Standfuss
10,314,477 B1 * 6/2019 Goodsitt .............. H04N 1/6088
(Continued)

FOREIGN PATENT DOCUMENTS

EP 1541373 A2 6/2005
WO 2007076853 A1 7/2007

OTHER PUBLICATIONS

Chen et al, "Gated-GAN: Adversarial Gated Networks for Multi-Collection Style Transfer" in IEEE Transactions on Image Processing, vol. 28, No. 2, pp. 546-560, Feb. 2019, doi: 10.1109/TIP.2018.2869695.

*Primary Examiner* — Darryl V Dottin
(74) *Attorney, Agent, or Firm* — The Webb Law Firm

(57) ABSTRACT

The invention relates to a computer-implemented method for generating a decorative pattern for decorative panels, such as decorative floor panels, wall panels, or ceiling panels. The invention also relates to a method for manufacturing of decorative panels, by using the aforementioned method according to the invention. The invention further relates to a non-transitory program storage device (NPSD) comprising computer readable instructions executable by one or more processors to perform the method according to the invention. The invention additionally relates to a system, including: one or more processors; and one or more non-transitory program storage devices (NPSDs) including computer readable instructions executable by the one or more processors to perform the method according to the invention. The invention furthermore relates to a decorative panel obtained by applying the manufacturing method according to the invention.

24 Claims, 7 Drawing Sheets
(7 of 7 Drawing Sheet(s) Filed in Color)

(51) Int. Cl.
*G06F 3/0482* (2013.01)
*G06T 7/30* (2017.01)

(52) U.S. Cl.
CPC ............. *G06T 2207/20084* (2013.01); *G06T 2207/30144* (2013.01); *G06T 2207/30161* (2013.01)

(56) References Cited

U.S. PATENT DOCUMENTS

| | | |
|---|---|---|
| 2003/0203165 A1 | 10/2003 | Nobles et al. |
| 2013/0167355 A1 | 7/2013 | Utz et al. |
| 2020/0169785 A1* | 5/2020 | Goodsitt .............. H04N 21/251 |

* cited by examiner

COMPUTER-IMPLEMENTED METHOD FOR GENERATING A DECORATIVE PATTERN FOR DECORATIVE PANELS, AND MANUFACTURING METHOD OF SUCH PANELS

CROSS-REFERENCE TO RELATED APPLICATIONS

This application claims priority to The Netherlands Patent Application No. 2032705 filed Aug. 9, 2022, the disclosure of which is hereby incorporated by reference in its entirety.

BACKGROUND OF THE INVENTION

Field of the Invention

The invention relates to a computer-implemented method for generating a decorative pattern for decorative panels, such as decorative floor panels, wall panels, furniture panels, or ceiling panels. The invention also relates to a method for manufacturing of decorative panels, by using the aforementioned method according to the invention. The invention further relates to a non-transitory program storage device (NPSD) comprising computer readable instructions executable by one or more processors to perform the method according to the invention. The invention additionally relates to a system, comprising: one or more processors; and one or more non-transitory program storage devices (NPSDs) comprising computer readable instructions executable by the one or more processors to perform the method according to the invention. The invention furthermore relates to a decorative panel obtained by applying the manufacturing method according to the invention.

Description of Related Art Decorative panels of the above-mentioned type are known as such. Herein, the printed motif, whether or not by the intermediary of primer layers, can be printed directly on a core layer. However, initially the print may also be provided on a flexible material sheet, such as a paper sheet, wherein this printed material sheet then as such, as a so-called decor layer, is taken up into said top layer of the covered panel or floor panel. Further, it is known that such panels can be provided with a transparent or translucent synthetic material layer, which forms a protective layer above the printed motif and may comprise, for example, wear-resistant particles, such as aluminium oxide.

It is known that the printed motifs of such panels can be obtained by means of a method which comprises at least the steps of forming, by means of printing cylinders on a substrate, either on a flexible material sheet, or directly on a board-shaped substrate, a larger decorative print and of forming said covered panels by means of at least a portion of this substrate and the decorative print provided thereon. Herein, for the step of forming the decorative print, this relates in particular to the technique of rotary offset printing, which, for printing on board- shaped substrates, is known, for example, from US 3,173,804, and for printing on flexible material sheets is known, for example, from EP 1 541 373. In these known techniques, the length of a print pattern obtained by means of printing cylinders is limited by the circumference of the printing cylinder. This means that, when one wants to realize panels with a printed motif that is longer than the circumference of such printing cylinder, this printed motif will show a repetition of at least a portion of the respective print pattern. It is noted that the length of such print pattern usually is smaller than 1.4 meters. In order to remedy the disadvantages of the offset printing technique, it is suggested, amongst others, in WO 2007/076853, to print transversely. This means that the printed motifs of the covered panels are obtained from a larger print in which these printed motifs extend transversely instead of parallel to the printing direction. In this manner, printed motifs can be realized with a length approximately corresponding to the width of the printing cylinders, without repetitions occurring in this printed motif. The width of the printing cylinders usually is larger than their circumference and may be, for example, approximately 2 meters. By this method, it is impossible to obtain printed motifs which are longer than the length of the printing cylinders, and this independently of the fact whether one wants to accept repetitions of the printed pattern or not. Moreover, due to this circumference-width- ratio of the printing cylinders in transverse printing, the number of possibly obtainable panels with different motif is smaller than with the usual longitudinal printing, wherein the printed motifs extend in the larger print parallel to the printing direction. It is noted that a possible utilization of printing cylinders with a larger diameter and circumference for realizing longer print patterns of course is limited by the construction of the printing device concerned.

Since recently, the variety in printed motifs can be improved by using digital printing techniques, such as inkjet printing, wherein a large image file, such as a scanned wood pattern based image file is used to realize the printed motifs. Such an image file is typically sufficiently large to cover 8 to 10 panels of regular size. This means that when 8 to 10 panels are packed in a package all panels may carry a unique printed motif. However, since a panel covering is typically composed of more than 10 panels, a repetition of printed motifs will still occur.

SUMMARY OF THE INVENTION

It is an object of the invention to provide an improved method to realize more variety in decorative patterns for decorative panels.

It is a first object of the invention to provide an improved method to realize more variety in decorative patterns for decorative panels.

It is a second object of the invention to provide an improved method to manufacture decorative panels.

It is a third object of the invention to provide an improved method to manufacture non-repetitive decorative panels.

It is a fourth object of the invention to provide an improved method to realize a user-customized design of decorative patterns for decorative panels, and to subsequently manufacture said panels.

At least one of these objects can be achieved by providing a computer-implemented method for generating a decorative pattern for decorative panels according to the preamble, comprising the steps of:
  a) obtaining at least one digital input image for at least one decorative panel,
  b) obtaining a user selection of at least one style preference of at least one style,
  c) applying, by using at least one (trained) neural network and/or at least one generative adversarial network (GAN), wherein each (trained) neural network and/or each GAN is associated with a corresponding style change (style transfer), at least one user selected style preference to said at least one digital input image to change the style of said input image to generate a digital output image for at least one decorative panel.

The neural network may be trained in an ad hoc fashion to learn new styles based on small sets of input images, e.g., fewer than 100 images of a particular style. Adversarial training, such as in the form of a discriminator network and/or (conditional) Generative Adversarial Network (GAN) may also optionally be incorporated into the training process to reduce unwanted artifacts and generate images that more closely match the selected style. In this manner, the re-rendered images look more natural and further reduce the artifacts. For this purpose, a discriminator network may optionally be used to score real and "fake" training images, including the output image, e.g., with higher scores corresponding to images that more correctly portray the selected style and lower scores corresponding to images that the discriminator is able to determine are not "real" images having the selected style. A (directly or indirectly) selected style vector may be input into the discriminator network so that it is conditioned on both the real image and the selected style vector. Without such conditioning, the C-GAN would be disadvantaged in determining whether the image correctly portrayed the selected style. In some cases, the discriminatory may be specifically modified to handle the use of paired training images (i.e., wherein each training image pair comprises a stylized and an unstylized version of the training image). In other cases, a pool memory of historically-generated image examples may be randomly sampled from when training the GAN. The output image generated used during step c) may optionally be added to said pool memory.

By using such artificial intelligence to generate output image(s) based upon input image(s) combined with one or more style (transfer) preferences, an unlimited number of (unique) decorative patterns can be generated to be applied onto one or more (decorative) panels. Since the method according to the invention is not bound to image size or other restriction a non-repetitive series of decorative panels can be realized for composing a covering, such as a floor covering, wall covering, ceiling covering, or furniture covering. This attractive aspect of a greater variety in decorative patterns (motifs) is further enhanced by allowing the user to selected one or more style preferences to be applied to an input decorative pattern, which allows the user to personally customize the decorative pattern, and hence the decorative panels onto which said decorative pattern is applied.

Preferably, during step a) at least one digital input image is selected from an image database. This image database may for example comprise a plurality of scanned wood pattern images. Additionally or alternatively, the image database may comprises alternative patterns, such as for example marble patterns, metal patterns, ceramic patterns, stone patterns, porcelain patterns, and/or alternative images, such as for example artwork images. This image database may be updated from time to time, either by an administrator and/or by one or more users.

During step a) at least one digital input image may be selected by a user. To this end, the user may for example scroll through an image database to select a desired input image. It is also imaginable that the user may indicate a preference, such as "oak pattern" or "ceramic pattern", after which a matching input image is selected from an image database by a computer. A combination of both options is also imaginable.

During step a) at least one selected digital base image may be uploaded to a server for further processing during step c). In this manner, the user is able to upload own photos of preference, such as one or more personal photos, to be incorporated in decorative panels.

Preferably, the image resolution of the input image is above a minimum threshold, which is preferably at least 4K. 4K is four times the number of pixels of 1080×1080 images, which were once the benchmark of high-quality images and video. To achieve a 4K quality image, it must be 3840×2160 pixels. The use of higher resolutions, like e.g. 8K (with pixel dimensions of 7680×4320), may also be used as minimal resolution threshold for input images.

During step b) at least one style may be chosen from the group consisting of: image shade and image colour temperature. With respect to the image shade style, the user may for example choose between light shade, medium shade, and dark shade. With respect to the image colour temperature, the user may for example chose between cool temperature, neutral temperature, and warm temperature. Optionally, the user may be allowed to adjust the image shade style and/or the colour temperature style and/or another image style in a continuous or semi-continuous manner, for example by displaying sliders on a screen, in particular a user interface displayed on said screen. Sliders are digital components for adjusting settings that reflect intensity levels. Here, continuous sliders may be used which allow users to select a value along a subjective range. They do not require a specific value to make adjustments, although they may, in some instances, offer an editable numeric value. Discrete sliders may also be used which allow users to select a specific value from a range.

Alternatively or additionally, during step b) at least one style may represent an image filter chosen from the group consisting of: mean filter, median filter, Gaussian smoothing, conservative smoothing, Crimmins speckle removal, frequency filters, Laplacian filter, Laplacian of Gaussian filter, and unsharp filter. Mean filtering is a simple, intuitive and easy to implement method of smoothing images, i.e. reducing the amount of intensity variation between one pixel and the next. It is often used to reduce noise in images. The median filter is normally used to reduce noise in an image, somewhat like the mean filter, although the image detail are preserved in an improved manner by using the median filter. The Gaussian smoothing operator is a 2-D convolution operator that is used to make image more blurry and to remove detail and noise. In this sense it is similar to the mean filter, but it uses a different kernel that represents the shape of a Gaussian ('pen-shaped') hump. Conservative smoothing is a noise reduction technique that derives its name from the fact that it employs a simple, fast filtering algorithm that sacrifices noise suppression power in order to preserve the high spatial frequency detail (e.g. sharp edges) in an image. It is explicitly designed to remove noise spikes, being isolated pixels of exceptionally low or high pixel intensity (e.g. salt and pepper noise) and is, therefore, less effective at removing additive noise (e.g. Gaussian noise) from an image. Crimmins Speckle Removal reduces speckle from an image using the Crimmins complementary hulling algorithm. The algorithm has been specifically designed to reduce the intensity of salt and pepper noise in an image. Increased iterations of the algorithm yield increased levels of noise removal, but also introduce a significant amount of blurring of high frequency details. Frequency filters process an image in the frequency domain. The image is Fourier transformed, multiplied with the filter function and then re-transformed into the spatial domain. Attenuating high frequencies results in a smoother image in the spatial domain, attenuating low frequencies enhances the edges. All frequency filters can also be implemented in the spatial domain and, if there exists a simple kernel for the desired filter effect, it is computationally less expensive to perform the filtering in the spatial domain. Frequency filtering is more appropriate if no straightforward kernel can be found in the spatial domain, and may also be more efficient. The Laplacian filter is a 2-D isotropic measure of the 2nd spatial derivative of an image. The Laplacian of an image highlights regions of rapid intensity change and is therefore often used for edge detection (see zero crossing edge detectors). The Laplacian is often applied to an image that has first been smoothed with something approximating a Gaussian smoothing filter in order to reduce its sensitivity to noise, and hence the two variants will be described together here.

The unsharp filter is a simple sharpening operator which derives its name from the fact that it enhances edges (and other high frequency components in an image) via a procedure which subtracts an unsharp, or smoothed, version of an image from the original image. The unsharp filtering technique is commonly used in the photographic and printing industries for crispening edges.

Preferably, each user-selected style preference of a style is processed by using at least one GAN which is trained to process said style, to secure that the output image(s) looks realistic and natural. Typically, a generator of the GAN generates a fake image, typically a unique image, based upon the input image and the one or more indicated style preferences. This fake image is fed into a discriminator of the GAN alongside a stream of images taken from a ground-truth dataset, which may at least partially be formed by the input image database described above, but may also, additionally or alternatively, be based in a separate dataset built during training of the GAN. The discriminator takes in both real and fake images and returns probabilities, a number between 0 and 1, with 1 representing a prediction of authenticity and 0 representing fake. In case the authenticity probability is sufficiently high, for example larger than 0.5, preferably larger than 0.75, more preferably larger than 0.9, even more preferably larger than 0.95, 0.96, 0.97, 0.98, and/or 0.99 the image can be accepted as output image.

During step b) at least one style preference is preferably obtained by allowing a user to select at least one style preference out of a plurality of, preferably predefined, style options for a specific style. More preferably, during step b) a plurality of style preference is obtained by allowing a user to select a plurality of style preferences out of a plurality of styles.

It is imaginable that the one or more output images are generated real-time, by using one or more GANs, after having obtained at least one input image and at least one style preference. However, running the GAN frequently requires a lot of processing power, which may affect the speed to generated said output image(s) and which may be experienced negatively by users. Typically, a couple of seconds will be needed these days to generate at least one output image which may be experienced as rather long by users. It may therefore be preferred to prepare and store a number of, preferably all, possible output images already in an output image database, based upon possible combinations of input images and style preferences. After obtaining the user style preferences, the matching (prestored) output image can be retrieved from the output image database. This may save a considerable amount of time. It is also imaginable that users may manually scroll through the output image database to select one or more output images. It is imaginable that once an output image is used, this output image is removed from the output image database to secure unicity of the (selected) output image in the course of time. Once the output image database is running empty, the process of pre-generating output images to be stored in the output image database may be repeated.

Typically, the one or more output images represent a décor, motif, and/or pattern, often in colour, to be printed with (coloured) ink onto a base panel to realize one or more decorative panels. Hence, the output images are typically directed to realize the visual appearance (the "looks") of the decorative panel. However, it is additionally imaginable that during step b) a plurality of style preferences is obtained, wherein at least one visual related style preference is obtained which is configured to modify the input image obtained during step a), and wherein at least one relief related style preference is obtained which is configured to define a relief structure to be applied, preferably printed, on top of the output image during manufacturing of a decorative panel. Hence, it is also imaginable that during the selection process a relief structure is selected and/or generated. Said relief structure, also referred to as embossing structure, preferably matches the visuals of the one or more output images at least partially, preferably entirely. This alignment is also referred as an alignment in register. This is for example attractive for imitated wood pattern, wherein the relief structure may comprise a plurality of impressions or cavities and/or grooves created by printing the relief structure, which are in register with the wood nerves and wood pores of the printed wood pattern. The location and depth of the impressions, cavities, and/or grooves, being a function of the wood nerves and wood pores of the printed pattern. The relief structure gives an improved and more realistic look-and-feel effect to the eventual decorative panels. Hence, preferably, the relief related style preference may be dependent on the at least one input image and/or on the obtained at least one visual related style preference. However, also for other image types, a matching relief structure can be created and/or generated. It is also imaginable that the relief structure does purposively not match the decorative output image, for example, in case the relief structure serves one or more different purposes. It is, for example, imaginable that at least one relief related style preference defines at least one grout and/or chamfer (bevel) to be applied to the decorative panel, preferably at least one edge of the decorative panel. The relief related style preference is disregarded for generation of the output (decorative) image during step c). The relief related style preference may lead to an additional digital file, which may be referred to as output relief structure file, or output relief image.

It is conceivable that at least one relief related style preference is selected by user. This allows the user to not only customize the décor (motif) of the panel to be manufactured, but also the relief structure of this panel. However, it is also conceivable that at least one relief related style preference is autonomously generated by at least one GAN.

Preferably, the relief structure is a printed structure, wherein transparent and/or translucent ink is used. This allows the underlying décor to remain visible. The relief structure can be composed of a single ink layer or of a plurality of ink layer.

Preferably, the relief structure is at least partially composed of a printed base layer. Preferably, the base layer is a printed base layer, more preferably a digitally printed base layer. This means that the base layer, initially in liquid state, is printed either directly or indirectly on top of the decorative layer. One or more indentations may be provided in the base layer when the base layer is still in liquid state and/or one or more indentations may be provided in the base layer during and/or after curing (solidifying) the base layer. Providing one or more indentations in the liquid base layer is preferably done by means of chemically embossing. To this end, preferably (small) droplets of an embossing liquid are position-selectively printed (sprayed) onto the liquid base layer to cause a chemical reaction between the material of the printed droplets and the still liquid base layer, wherein the subsequent reaction product changes the structure at this location of the base layer optically and/or haptically. Providing one or more indentations in the base layer during or after curing may be done by either chemical embossing (as described above) and/or by mechanical embossing e.g. by using a laser or particle beam, such as a water beam.

Preferably, the indentations provided in the base layer have a depth situated in between 2 micron and 100 micron, preferably situated in between 3 micron and 50 micron. Preferably, the elevations of the elevated pattern layer have a height situated in between 2 micron and 500 micron, preferably situated in between 3 micron and 300 micron. The total embossing depth is determined by the sum of the greatest indentation depth and the greatest elevation height. In case a plurality of base layers and/or a plurality of elevated pattern layers is applied, an increase of the total embossing depth can be achieved.

During step d) at least one style vector representative of at least one obtained style preference may be obtained, wherein said at least one style vector is injected into at least one GAN, preferably a GAN relating to the style preference, at at least one location, preferably a plurality of locations; wherein the GAN with the injected style vector to stylize at least a portion of the input image into a stylized output image, based on the at least one obtained style preference. The style vector representative of a (first) style may be obtained from an embedding matrix. The (first) location where the style vector is injected into the neural network and/or the GAN may comprise one of: a bottleneck layer of the neural network; a down sampling layer of the neural network; or an up sampling layer of the neural network and/or the GAN. The style vector may be injected into the neural network and/or the GAN in the form of an additional feature channel, e.g., via concatenation with an existing feature map at the (first) location in the neural network and/or the GAN. In other such embodiments, a user may also be able to specify a desired strength for the application of the (first) style (such as for example a strength anywhere between 0% application of the first style and full, or 100%, application of the first style) on either a per-image, per-group of images, or generic basis.

In a preferred embodiment, the method comprises step e), comprising obtaining surface area information relating to a surface area to be covered by an assembly of decorative panels, wherein the output image generated during step d) is sized to fit at least said surface area, and preferably is sized to fit a larger surface area than the surface area obtained during step e). For example, the user may indicate that a surface area to be covered by decorative panels, wherein at least decorative panel is made by making use of the method according to the invention, measures A x B square meters. Based upon these dimensions, a computer may calculate the number of panels needed to covered said surface area, based upon a predefined or chosen size of the decorative panels. Based upon this surface area the number of output images is preferably calculated (by means of a computer). In case this number is 1 or smaller, the output image can be sized, in particular cropped. In case this number is larger than 1 a plurality of output images will have to be used to manufacture the entire decorative panel covering. Preferably, mutually different output images are used in this case to prevent pattern repetition.

Preferably, the method comprises step f), comprising obtaining a preferred panel size selected and/or defined by a user, wherein the output image generated during step d) is sized to fit at least said panel size, more preferably at least a plurality of said panel sizes, more preferably at least 8 times, even more preferably at least 10 times said panel sizes. This option allows further optimization of the panels. Moreover, since panels are typically packed in quantities of 8-10 panels per package, it is secure that all panels of a package will have different printed decors.

Preferably, the method comprises step g), following step f), comprising the sub steps of:
i) segmenting the digital input image and/or generated digital output image into a plurality of decorative panel images, wherein each decorative panel image is sized to fit on a decorative panel,
ii) assigning a positioning code to a decorative panel image for identifying its position in the digital input image and/or generated digital output image, and
iii) creating a digital layout, such as a staggered or non-staggered layout, of the plurality of decorative panel images,
iv) storing said positioning codes and said co-related digital layout for the purpose of manufacturing said plurality of decorative panels, and
v) optionally visualizing the digital layout on a digital screen.

The segmenting according to step i) is preferably performed according to a staggered array. This may not be really necessary for decorative wall panels, but for floor panels it is advantageous for obtaining a sturdy floor.

During manufacturing and without taking further measures, a part of the decorative panel image at the panel edges may be removed to realize one or more coupling profiles, such as a tongue and/or a groove, which would result in an interrupted image. In order to avoid this, preferably an inert zone (extension zone) is present at cutting and milling lines (machining lines) having a width corresponding to that which is machined away for providing the tongue and groove. This extension zone may be left blank, but if the machining is performed inaccurately one or more white lines may be present in the decorative surface if the used substrate is white paper. In a preferred embodiment, the occurrence of white lines through inaccurate machining may be eliminated by repeating in the extension zone image data retrieved from the output image. Preferably at least one, more each, decorative panel image includes at least one extension zone, which is configured to be removed from the decorative panel during panel manufacturing, in particular during creation of at least one coupling profile, such as a tongue or groove, at at least one edge of the panel.

The method preferably comprises step h), comprising obtaining a preferred panel installation pattern selected by a user, wherein the output image generated during step d) is partially based upon the preferred panel installation pattern obtained during step h). This means that the decorative output image can be aligned with the installation direction of the panels. For example, in case the output image represents a wood grain pattern with wood nerves, the wood nerves (main) direction and the longitudinal axis of the panels may be aligned with each other. This may obviously also be applied to alternative decorative patterns having longitudinal (oblong) lines of sight characterizing said patterns.

Preferably, the method comprises step j), comprising visualizing, on a digital screen, the preferred panel size and/or the preferred panel installation pattern obtained during step f) and/or step h) as overlay image over the obtained digital input image and/or the digital generated output image. Such a layered view imitates to eventual decorative covering to be realized, which gives the user a good impression of what to expect and to adjust the design of the covering if deemed needed.

The invention also relates to a method for manufacturing of decorative panels, by using the method according to the invention as discussed above, comprising the steps of:

k) applying the computer-implemented method according to the invention as discussed above to generate at least one digital output image, l) printing said at least one output image, directly or indirectly, onto at least one base panel, and m) optionally covering said output image with at least one protective layer.

These manufacturing method may be considered as sequential steps following steps a)-d), and optional further steps, as discussed above. Hence, the manufacturing method may be considered as an extension of the artificial intelligence based method described above.

The base panel may be provided with at least one primer layer prior to printing said at least one output image onto said base panel. Preferably, said primer layer has white or whitish colour which will be in favour of the colour appearance (colour authenticity) of the printed output image.

Preferably, a protective layer is applied over the decorative image by way of an overlay, i.e. a resin provided carrier, or a liquid coating, preferably while the decorative layer is laying or is printed on the base panel, either loosely or already connected or adhered (e.g. by printing) thereto. Preferably, at least one protective layer is printed during step m). The printed or non-printed protective layer may include hard particles, like corundum. The protective layer may be the outermost layer, although a top coating may be applied on top of the at least one protective layer. Preferably, at least one protective layer has a relief structure (embossing structure), with cavities, and/or recesses, and/or grooves, etc., which may be realized by etching, and/or digital printing, and/or mechanically impressing. Examples of how to realize this relief structure by means of printing are already described above. Preferably the relief structure is aligned with the decorative image.

Preferably, the method comprises step n), comprising the step of providing at least one panel edge with at a coupling profile, such as a tongue and/or groove to allow adjacent panels to interconnect, preferably such that interconnected panels are interlocked in both a horizontal and vertical direction.

Preferably, the method comprises step o), comprising dividing (cutting or sawing) the base panel into a plurality of decorative panels. Preferably, the digital layout is digitally printed onto the base panel during step l), and wherein during step o) the base panel is divided into a plurality of decorative panels, such that the front side of each decorative panel includes one of the plurality of printed decorative panel images and the backside of each decorative panel preferably includes the positioning code of the decorative panel image printed on the front side of said decorative panel. Preferably, use is made of the previously mentioned extension zones to prevent loss of data of the output image and hence to prevent a distorted image. The extension zones are at least partially removed during step o).

The invention furthermore relates a non-transitory program storage device (NPSD) comprising computer readable instructions executable by one or more processors to perform the method according to the invention, in particular the computer-implemented method for generating a decorative pattern for decorative panels, such as decorative floor panels, according to the invention. The NPSD may include magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory and storage may be used to retain computer program instructions or code organized into one or more modules and written in any desired computer programming language. When executed by a processor, such computer program code may implement one or more of the methods or processes described in this document. A power source of the NPSD may comprise a rechargeable battery (e.g., a lithium-ion battery, or the like) or other electrical connection to a power supply, e.g., to a mains power source, that is used to manage and/or provide electrical power to the electronic components and associated circuitry of electronic device.

The invention additionally relates to a system, comprising:

one or more processors; and one or more non-transitory program storage devices (NPSDs) comprising computer readable instructions executable by the one or more processors to perform the method according to the invention, in particular the computer-implemented method for generating a decorative pattern for decorative panels, such as decorative floor panels, according to the invention.

The system or at least one NPSD may be in direct (or indirect) communication with a manufacturing line for manufacturing decorative panels, in particular with at least one printing device of said manufacturing line for printing the output image(s), and, if applicable, at the relief structure onto the panel. The system or at least one NPSD may be configured to send one or more printing jobs, directly or indirectly, to at least one printing device of a manufacturing line (manufacturing system) for manufacturing decorative panels.

The invention furthermore relates to a decorative panel obtained by applying the method according to the invention. Such a decorative laminate panel (composed of multiple layers) for a personalized or customized decorative surface according to a preferred embodiment of the present invention may comprise a front side which includes an inkjet printed decorative laminate panel image that represents a portion of the personalized or customized decorative surface; and a back side of decorative laminate panel which optionally includes a positioning code for positioning the decorative laminate panel in the correct location of the personalized or customized decorative surface. In a more preferred embodiment, the back-side of the decorative laminate panel further includes customer details or an identification code for identifying a customer or his delivery address. This allows timely delivery of the finished decorative laminate panels, especially in the case where both a decor printer and a laminate manufacturer are involved. Preferably, these decorative panels are usually shipped in a package including a set of decorative laminate panels covering about 1 $m^2$ of surface. This allows easy handling when assembling the decorative surface.

In one embodiment, a set of decorative laminate panels includes at least one decorative panel according to the present invention described here above, and preferably is solely composed of decorative panels which are produced by using the method(s) according to the invention. It is not imperative that all decorative laminate panels have a positioning code on the back-side of the panel. For example, a set may contain a single decorative laminate panel including part of a personalized image, e.g. a specific piece of artwork, while the other panels could be merely used and intended as "background" panels, such as wood-grain patterned panels. For these wood-grain patterned panels, a correct positioning is often not necessary as it does not provide a disturbing distorted decorative image, thus allowing random selection of such a background panel. However, in the most preferred embodiment, each decorative laminate panel includes a positioning code on the back-side of decorative laminate panel. The latter is especially useful for very large surfaces.

It may be advantageous in case the set of decorative laminate panels includes an assembly layout in the package. The assembly layout helps the user or installer to position the decorative laminate panels in the correct position so that the original personalized or customized decorative surface image is reproduced on e.g. a floor if the decorative panels are floor panels. The assembly layout may be a physical assembly layout and/or a virtual assembly layout. An example of a physical assembly layout is an assembly layout printed on a piece of paper accompanying the decorative laminate panels in a package or more preferably an assembly layout printed on the back-side of a decorative panel. A virtual assembly layout is preferably printed as a code on the backside of a decorative laminate panel. For example, the virtual assembly layout can be a QR-code or a barcode, which can be scanned by a smart phone to download the assembly layout to the smartphone. Alternatively, the identification code can be used to download the assembly layout from a website. As an example of an assembly layout, each printed position code may e.g. including "RnCm" position codes, wherein R represents the row number, C represents a column number, and wherein n and m represent integers.

The output image(s) may be printed directly onto a base panel and/or onto a primer layer applied onto the base panel. Alternatively, the output image(s) may be printed firstly onto a sheet or film, such as a paper sheet or plastic film, after which said printed sheet or film is laminated onto a base panel, for example by means of gluing and/or heat pressing (fusion). The material of the base layer is not of significant importance for this invention, but may, for example, comprises at least one thermoplastic material, and/or at least one mineral material, and/or wood. The base panel may be reinforced by one or more reinforcement layers, such as glass fibre layers.

Preferably, the decorative panels are assembled in staggered arrangement are capable of reproducing the requested personalized of customized decorative image without any distortion. The decorative laminate panels in the set of decorative laminate panels preferably have coupling profiles to allow panels to be interconnected. Such a coupling profiles typically include a tongue and groove connection. Preferably the coupling profiles are configured to lock the panels in coupled condition, both in a horizontal and vertical direction. In this manner a mutual fixation of the panels can be secured, and therefore the output image can be kept in tact, in particular in case said output image spans over a plurality of adjacent panels.

Preferred embodiments of the invention are presented in the non-limiting set of clauses presented below:

1. Computer-implemented method for generating a decorative pattern for decorative panels, such as decorative floor panels, comprising the steps of:
   a) obtaining at least one digital input image for at least one decorative panel,
   b) obtaining a user selection of at least one style preference of at least one style,
   c) applying, by using at least one generative adversarial network (GAN), wherein each GAN is associated with a corresponding style transfer, at least one user selected style preference to said at least one digital input image to generate a digital output image for said at least one decorative panel.
2. Method according to clause 1, wherein during step a) at least one digital input image is selected from an image database.
3. Method according to clause 2, wherein said image database comprises a plurality of scanned wood pattern images.
4. Method according to any of the preceding clauses, wherein during step a) at least one digital input image is selected by a user.
5. Method according to any of the preceding clauses, wherein during step a) at least one selected digital base image is uploaded to a server for further processing during step c).
6. Method according to any of the preceding clauses, wherein during step b) at least one style is chosen from the group consisting of: image shade and image colour temperature.
7. Method according to any of the preceding clauses, wherein during step b) at least one style represents an image filter chosen from the group consisting of: mean filter, median filter, Gaussian smoothing, conservative smoothing, Crimmins speckle removal, frequency filters, Laplacian filter, Laplacian of Gaussian filter, and unsharp filter.
8. Method according to any of the preceding clauses, wherein during step b) at least one style preference is obtained by allowing a user to select at least one style preference out of a plurality of, preferably predefined, style options for a specific style.
9. Method according to any of the preceding clauses, wherein during step b) a plurality of style preference is obtained by allowing a user to select a plurality of style preferences out of a plurality of styles.
10. Method according to any of the preceding clauses, wherein during step b) a plurality of style preferences is obtained, wherein at least one visual related style preference is obtained which is configured to modify the input image obtained during step a), and wherein at least one relief related style preference is obtained which is configured to define a relief structure to be applied, preferably printed, on top of the output image during manufacturing of a decorative panel.
11. Method according to clause 10, wherein the relief related style preference is dependent on the at least one input image and/or on the obtained at least one visual related style preference.
12. Method according to clause 10 or 11, wherein the relief related style preference is dependent on the at least one input image and/or on the obtained at least one visual related style preference, such that the relief is at least partially, preferably entirely, in register with the output image.
13. Method according to any of clauses 10-12, wherein at least one relief related style preference defines at least one grout and/or chamfer to be applied to the decorative panel, preferably at at least one edge of the decorative panel.
14. Method according to any of clauses 10-13, wherein the relief related style preference is disregarded for generation of the output image during step d).

15. Method according to any of clauses 9-14, wherein at least one relief related style preference is selected by user.
16. Method according to any of clauses 9-15, wherein at least one relief related style preference is autonomously generated by at least one GAN.
17. Method according to any of the preceding clauses, wherein during step d) at least one style vector representative of at least one obtained style preference is obtained, wherein said at least one style vector is injected into at least one GAN, preferably a GAN relating to the style preference, at at least one location, preferably a plurality of locations; wherein the GAN with the injected style vector to stylize at least a portion of the input image into a stylized output image, based on the at least one obtained style preference.
18. Method according to clause 17, wherein the style vector representative of the obtained style preference is obtained from an embedding matrix.
19. Method according to clause 17 or 18, wherein at least one location comprises one of: a bottleneck layer of the neural network; a down sampling layer of the neural network; or an up sampling layer of the neural network.
20. Method according any of clauses 17-19, wherein the style vector is injected into the GAN in the form of an additional feature channel, wherein the additional feature channel is concatenated with an existing feature map at at least one location in the GAN.
21. Method according to any of the preceding clauses, wherein the method comprises step e), comprising obtaining surface area information relating to a surface area to be covered by an assembly of decorative panels, wherein the output image generated during step d) is sized to fit at least said surface area, and preferably is sized to fit a larger surface area than the surface area obtained during step e).
22. Method according to any of the preceding clauses, wherein the method comprises step f), comprising obtaining a preferred panel size selected and/or defined by a user, wherein the output image generated during step d) is sized to fit at least said panel size, more preferably at least a plurality of said panel sizes, more preferably at least 8 times said panel sizes.
23. Method according to clause 22, wherein the method comprises step g), following step f), comprising the sub steps of:
    i) segmenting the digital input image and/or generated digital output image into a plurality of decorative panel images, wherein each decorative panel image is sized to fit on a decorative panel,
    ii) assigning a positioning code to a decorative panel image for identifying its position in the digital input image and/or generated digital output image, and
    iii) creating a digital layout, such as a staggered or non-staggered layout, of the plurality of decorative panel images,
    iv) storing said positioning codes and said co-related digital layout for the purpose of manufacturing said plurality of decorative panels, and
    v) optionally visualizing the digital layout on a digital screen.
24. Method according to clause 23, wherein at least one, preferably each, decorative panel image includes at least one extension zone, which is configured to be removed from the decorative panel during panel manufacturing, in particular during creation of at least one coupling profile, such as a tongue or groove, at at least one edge of the panel.
25. Method according to any of the preceding clauses, wherein the method comprises step h), comprising obtaining a preferred panel installation pattern selected by a user, wherein the output image generated during step d) is partially based upon the preferred panel installation pattern obtained during step h).
26. Method according to one of clauses 22-24 or clause 25, wherein the method comprises step j), comprising visualizing, on a digital screen, the preferred panel size and/or the preferred panel installation pattern obtained during step f) and/or step h) as overlay image over the obtained digital input image and/or the digital generated output image.
27. Method for manufacturing of decorative panels, by using the method according to any of the preceding clauses, comprising the steps of:
    k) applying the computer-implemented method according to any of the foregoing clauses to generate at least one digital output image,
    l) printing said at least one output image onto at least one base panel, and
    m) covering said output image with at least one protective layer.
28. Method according to clause 27, wherein at least one protective layer is printed during step m).
29. Method according to clause 27 or 28, wherein at least one protective layer has a relief structure.
30. Method according to any of clauses 27-29, wherein the method comprises step n), comprising the step of providing at least one panel edge with at a coupling profile to allow adjacent panels to interconnect.
31. Method according to any of clauses 27-30, wherein the method comprises step o), comprising dividing the base panel into a plurality of decorative panels.
32. Method according to clause 23 or 24 and clause 31, wherein the digital layout is digitally printed onto the base panel during step l), and wherein during step o) the base panel is divided into a plurality of decorative panels, such that the front side of each decorative panel includes one of the plurality of printed decorative panel images and the backside of each decorative panel preferably includes the positioning code of the decorative panel image printed on the front side of said decorative panel.
33. A non-transitory program storage device (NPSD) comprising computer readable instructions executable by one or more processors to perform the method according to any of clauses 1-26.
34. A system, comprising:
    one or more processors; and
    one or more non-transitory program storage devices (NPSDs) comprising computer readable instructions executable by the one or more processors to perform the method according to any of clauses 1-26.
35. Decorative panel obtained by applying the method according to any of clauses 27-32.

BRIEF DESCRIPTION OF THE DRAWINGS

The patent or application file contains at least one drawing executed in color. Copies of this patent or patent application publication with color drawings will be provided by the Office upon request and payment of the necessary fee.

The invention will be elucidated on the basis of non-limitative exemplary embodiments shown in the following figures, wherein, FIG. 1 schematically shows the architecture of a generative adversarial network (GAN) to generate images according to the invention.

DESCRIPTION OF THE INVENTION

Figure 1:
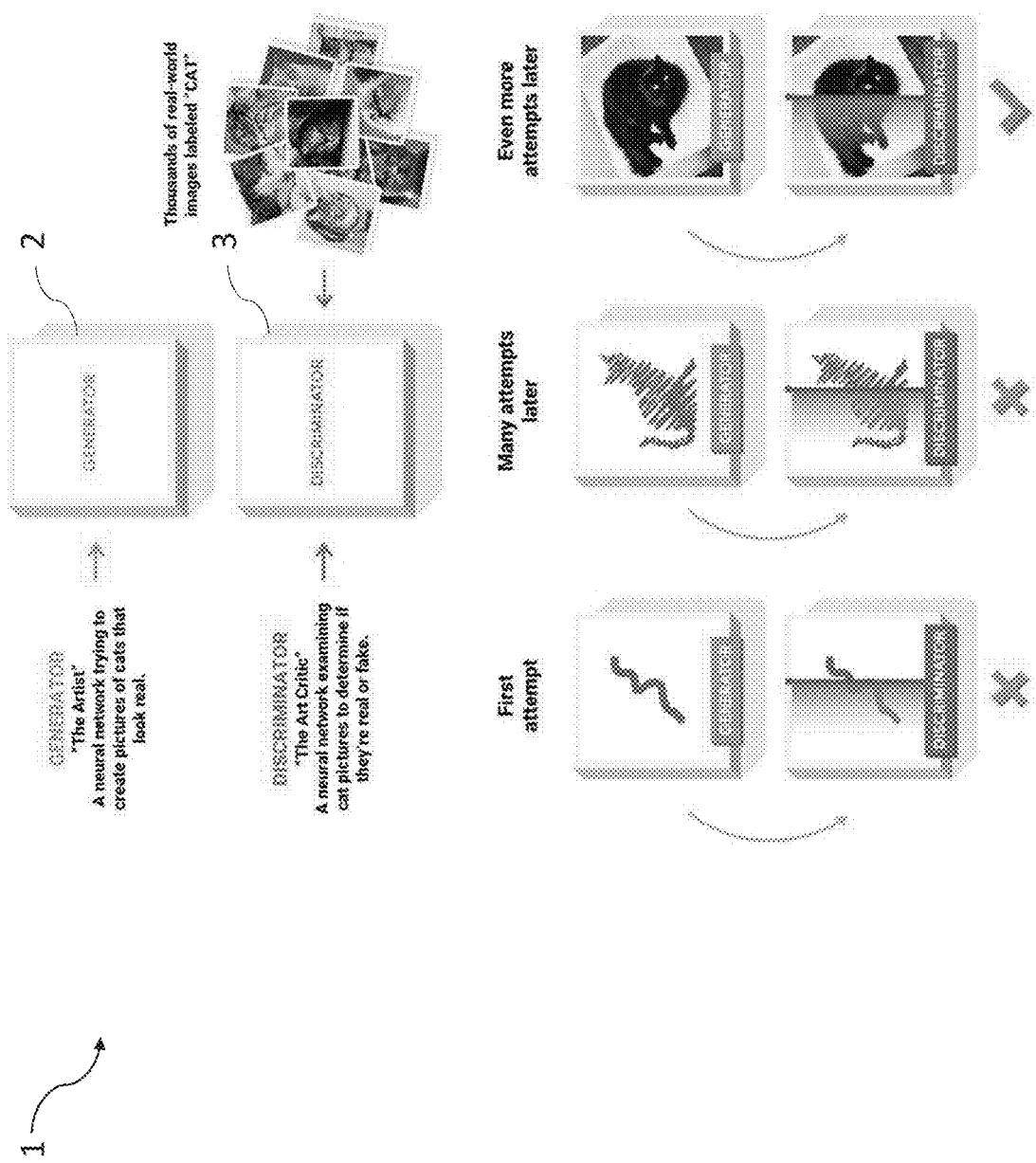

FIG. 1 schematically shows the architecture of a generative adversarial network (GAN) (1) to generate images. The GAN (1) comprises two neural networks (2, 3), namely a generator (2) and a discriminator (3). The generator (2) is a neural network that is capable of generating (image) data. The discriminator (3) on the other hand is a neural network that is capable of determining whether (image) data appears real or fake. Real (image) data is data that plausibly belongs to original training data. The purpose of the generator (2) is to generate new data that appears real to the discriminator (3). The generator (2) tries to fool the discriminator (3) by generating real looking (image) data while the discriminator tries to distinguish between real and fake (image) data. Therewith, the generator (2) trains on more (image) data to produce plausible results. In this embodiment, the generator (2) tries to create images of cats that look real. The discriminator (3) examines whether the images of cats are real or fake. In this example, the generator (2) generated images which was examined by the discriminator (3) as being a real image of a cat after a few attempts.

Figure 2:
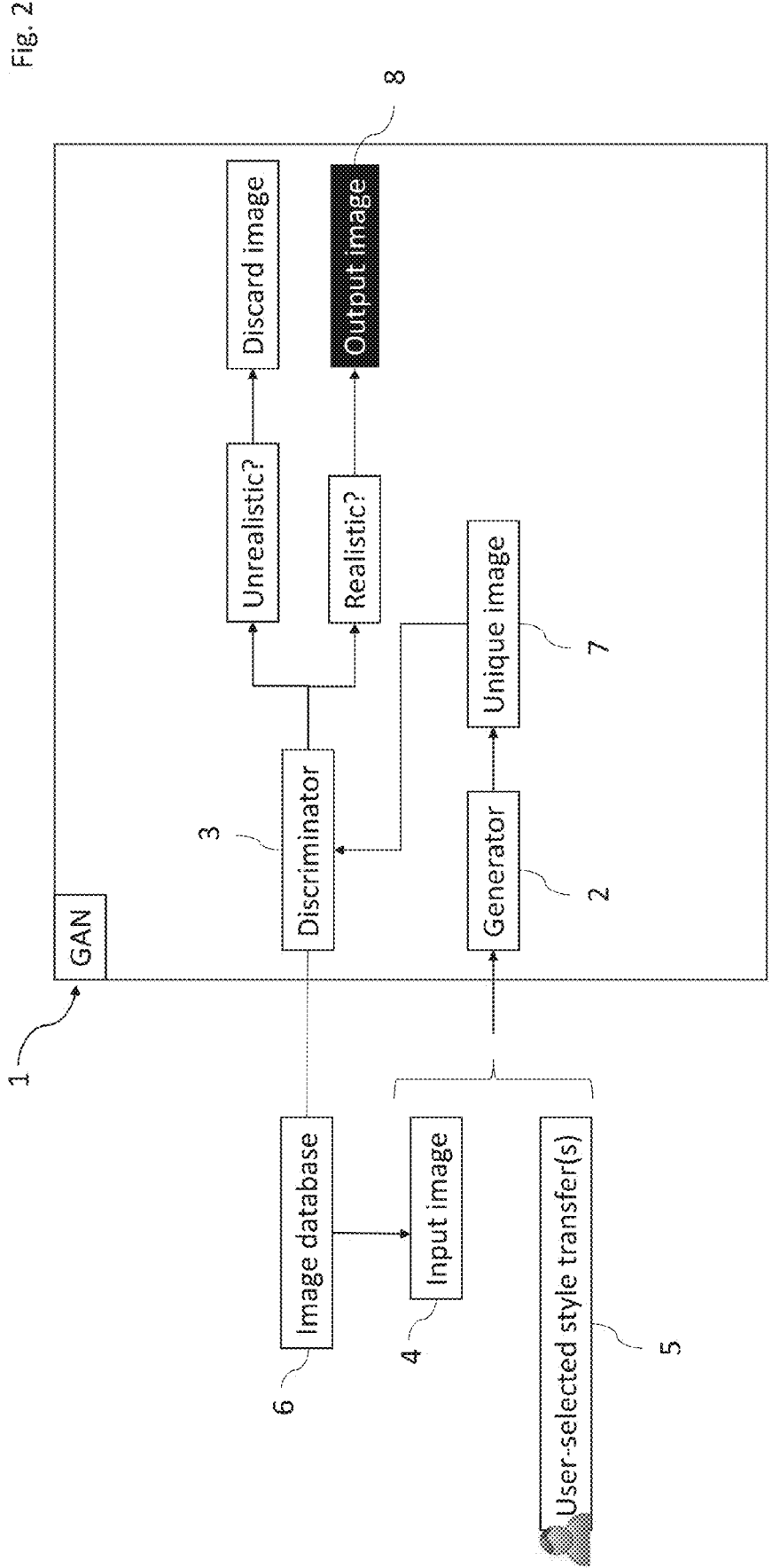
FIG. 2 schematically shows a framework of using a GAN architecture for generating stylized output images according to the invention.

FIG. 2 schematically shows a framework of using a GAN architecture (1) for generating stylized output images (8). A digital input image (4) and a user selection of at least one style preference (5) of at least one style is fed into the GAN architecture (1). The input image (4) can be selected by a user. Alternatively, the input image (4) is selected from an image database (6). The user can choose one or more image style preferences (5), such as image enhancements (i.e. image shade, image colour temperature, image brightening, etcetera) or image modifications (i.e. applying image filters, adjusting the white balance, etcetera). The input image (4) is fed into an encoder network, not shown in this figure, which interprets the input image (4) and encodes the input image (4) in various features relating to the input image (4) in a feature map. Style preference of a user is fed into the GAN (1) as a style vector representing the user-selected style preference (5). The style vector and the feature map, comprising the interpreted and encoded input image (4), may be concatenated into a concatenated feature map. This concatenated feature map is subsequently fed into the generator (2) of the GAN (1). The generator (2) combines features of the concatenated feature map and generates an unique image (7). The unique image (7) is then injected in the discriminator (3). The discriminator (3) examines whether the unique image (7) is a realistic image or an unrealistic image based on the images from the image database (6). When the discriminator decides that the unique image (7) is an unrealistic image than the image will be discarded. If the discriminator (3) decides that the unique image (7) is a realistic image than the image will be stored and used as an output image (8). The resulting output image (8) is a unique image which combined the input image (4) and the user-selected style preference (5). The use of a discriminator (3) has the advantage that artifacts are reduced and the output images match more closely with the selected style preference.

Figure 3:
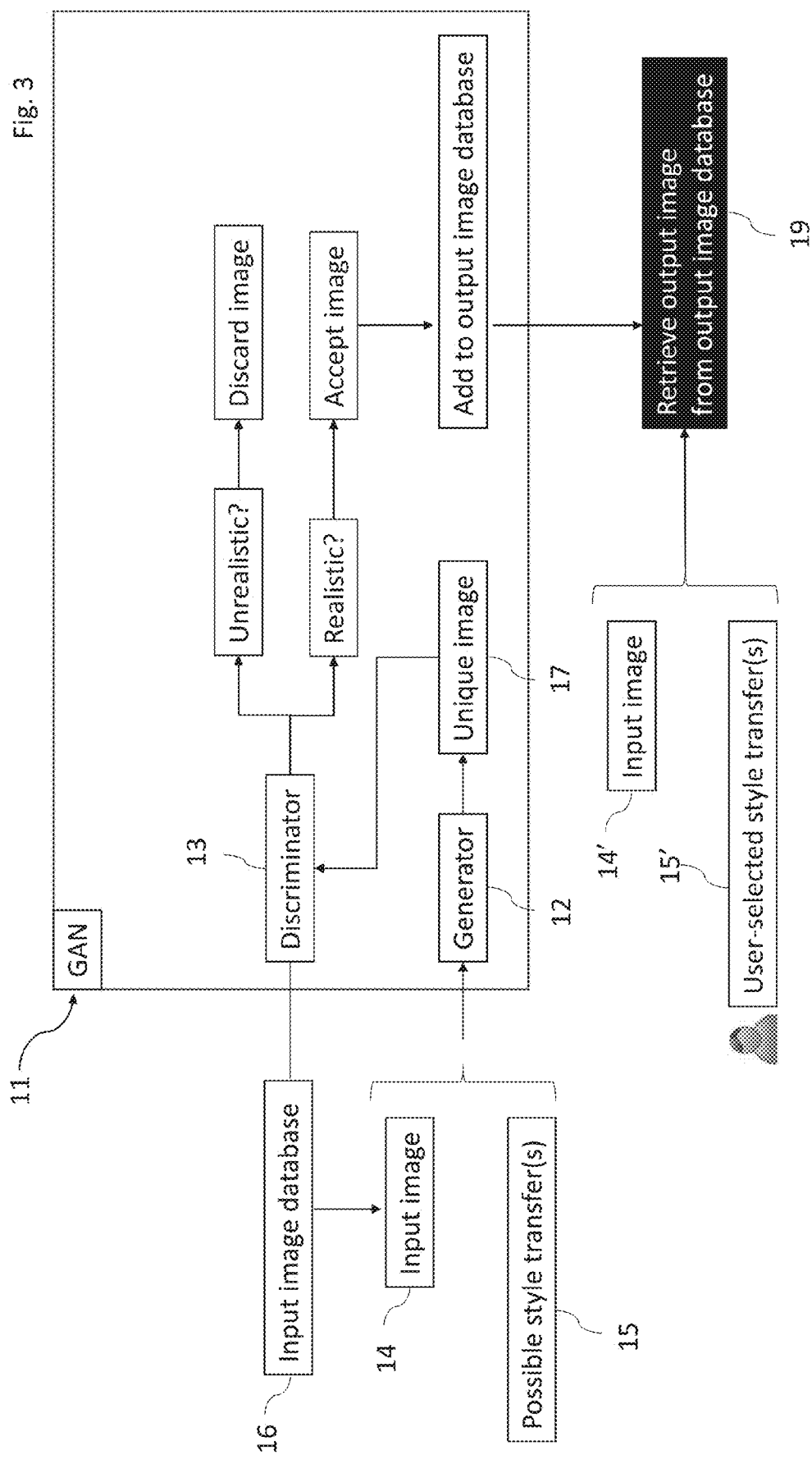
FIG. 3 schematically shows a framework of running the GAN asynchronously to generate unique output images according to the invention.

FIG. 3 schematically shows a framework of running the GAN (11) asynchronously to generate unique output images. In this embodiment, an input image (14) and a possible style preference (15) are injected into the GAN architecture (11). From the combination of the input image (14) and the possible style preference (15) the generator (12) generates a unique image (17). This unique image (17) is subsequently fed into the discriminator (13). The discriminator (13) examines on his turn whether the generated unique image (17) is realistic or unrealistic. If the discriminator (13) decides that the unique image (17) is unrealistic, the unique image (17) will be discarded. When the discriminator (13) decides that the unique image (17) is realistic then the unique image (17) will be accepted. Subsequently, this accepted image is added and stored into an output image database (19). In parallel, a user can select an input image (14') and a style preference (15') to generate a unique image. The unique output image resulting from the (user) selected input image (14') and style preference (15') is retrieved from the output image database (19) which is provided with unique output images from the in parallel running GAN (11). This asynchronously running of the GAN is of use when people are running the GAN at the same time in an online environment. Running the GAN namely requires a lot of processing power. Resulting in a slowly running GAN as a consequence of the time the GAN needs to generate a unique image. Additionally, due to the high processing power running the GAN will also be expensive. Therefore, asynchronously running the GAN is a solution to these two problems since the GAN will generate and store unique output images in a database with which users can interact to generate their unique image. Thereby, the process of generating a unique output image for the user will occur fast.

Figure 4:
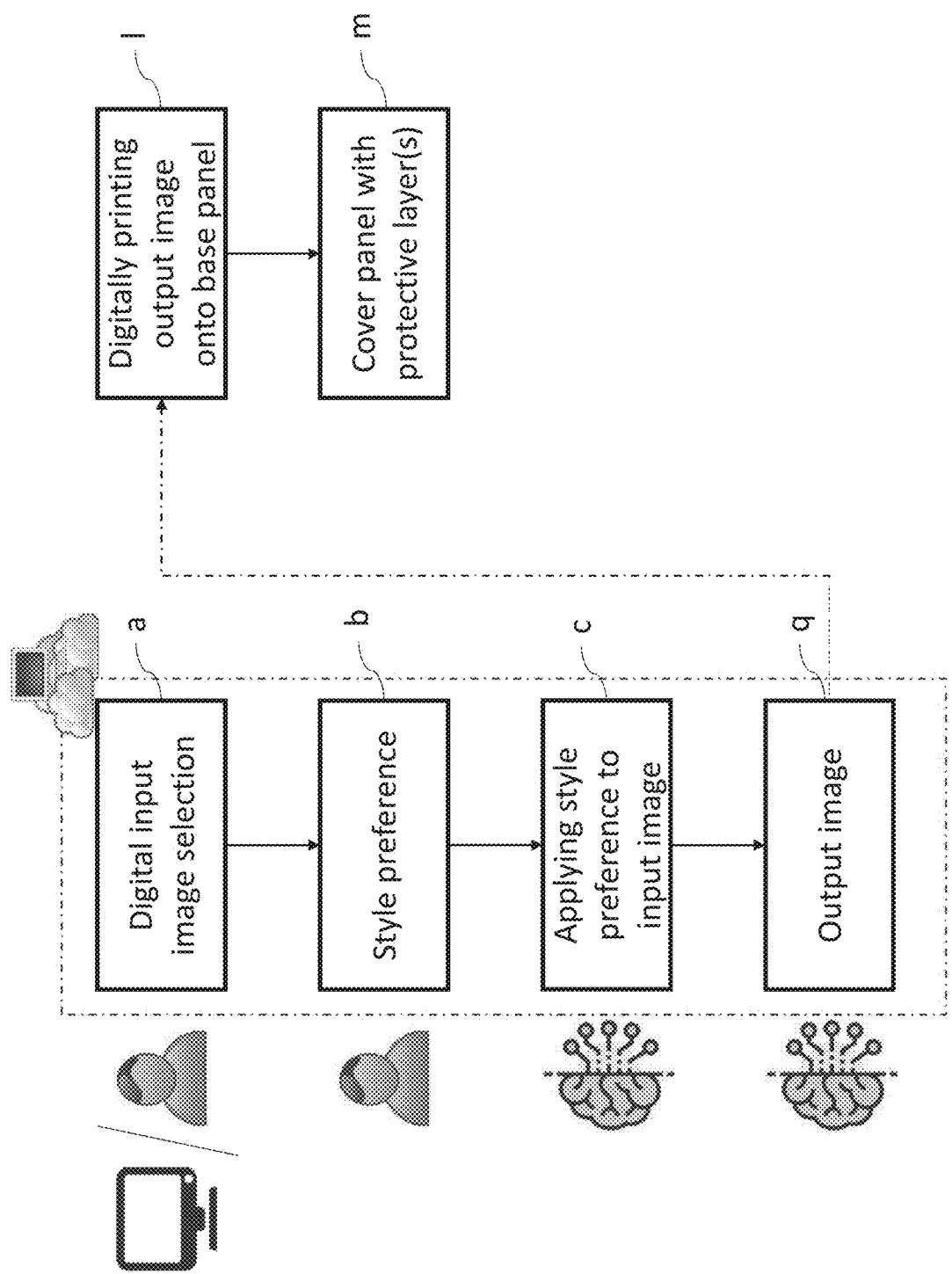
FIG. 4 schematically shows a flow chart of a computer-implemented method for generating a decorative pattern for decorative panels according to the invention.

FIG. 4 schematically shows a flow chart of a computer-implemented method for generating a decorative pattern for decorative panels. First, a digital input image for a decorative panel is selected (a). The digital input image can be selected (a) by a user or by an image database, wherein the image database comprises a plurality of scanned wood pattern designs. In addition, the user can also upload a photo to a server. This photo can subsequently be used as digital input image for a decorative panel. Second, the user selects at least one style preference (b). Thereby, the user can select one or more styles (b) such as image shade, image colour temperature and image filters. Third, the style preference is applied to the chosen digital input image in a GAN (c). Subsequently, the GAN generates a unique output image (q) combining the digital input image and the style preference of the user. This output image comprises a unique decorative pattern for decorative panels is the input for a printer. The printer will digitally print the output image onto a base panel (I). The output image can be printed on a film such as a paper film or a plastic film, more specifically a PVC film. Finally, when the output image is digitally printed onto the base panel a protective layer is attached to the panel to cover the panel (m).

Figure 5:
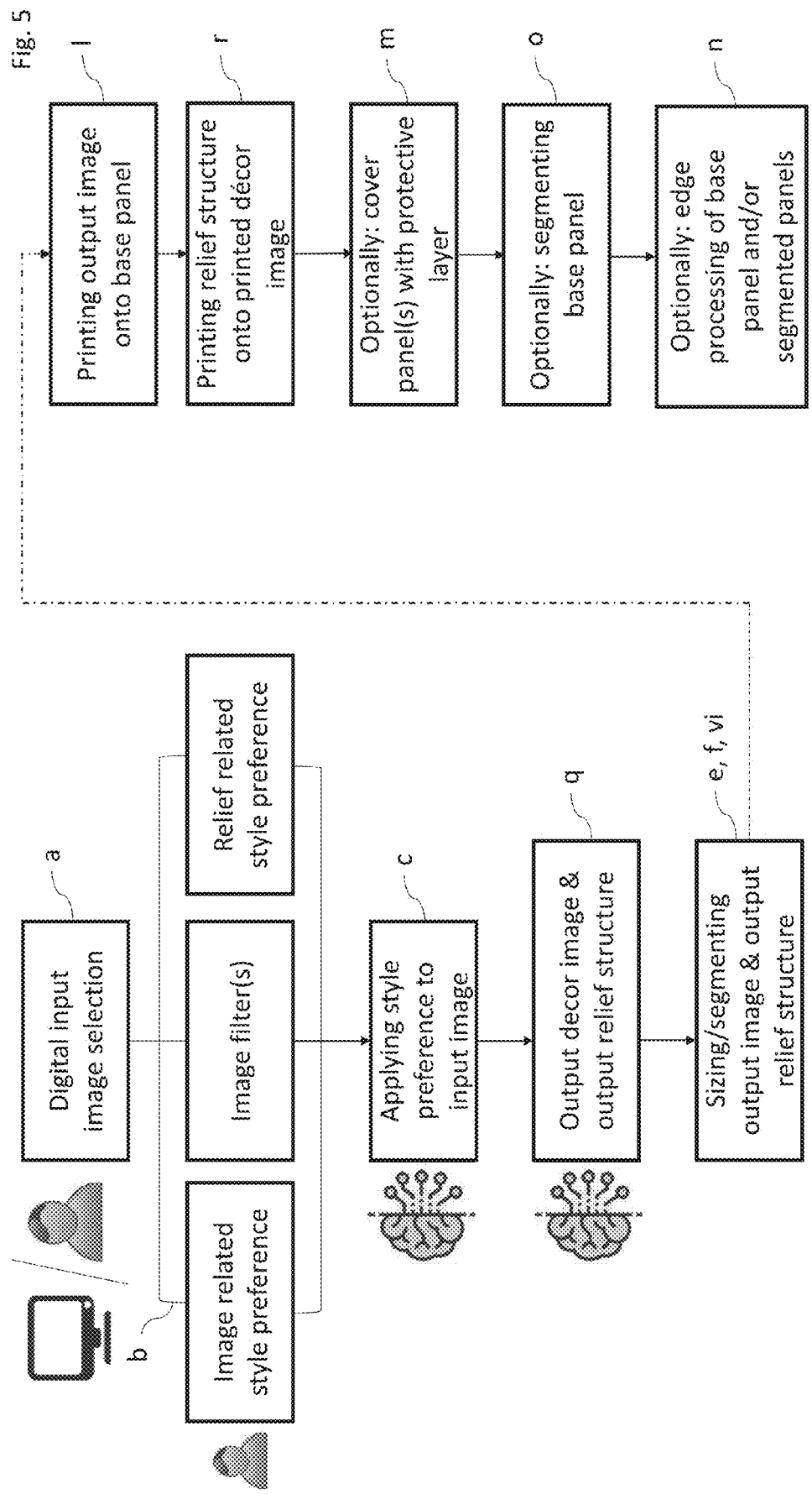
FIG. 5 schematically shows an extended flow chart of a computer-implemented method for generating a decorative pattern for decorative panels according to the invention.

FIG. 5 schematically shows an extended flow chart of a computer-implemented method for generating a decorative pattern for decorative panels. First, a digital input image for a decorative panel is selected (a) either by a user or by an image database. Thereafter, the user selects at least one style preference (b). The user can select one or more styles such as an image related style preference and/or an image filter. Image related style preferences are styles comprising the image shade, image colour, image colour temperature, or image brightening. In addition, the user can choose image filters to modify the image, according which masking filters can be applied to the image to limit portions of the digital input image that are of interest to be combined with the style preference in the stylization. The user can further choose a relief related style preference, wherein the user can choose a relief structure to be printed on a decorative panel. The chosen style preference(s) are subsequently applied to the chosen digital input image in a GAN (c). The GAN generates an output image (q) comprising an output image for the decorative layer and optionally an output image for the relief structure. The identified size of a panel (e), or the specified size of a panel indicated by the user (f) can be used to fit the output image onto panel. The identified size of a panel area (e), or the specified panel area indicated by the user (f) can be used to cover an assembly of decorative panels with the generated output image. Based on size information of one or an assembly of panels, the output image of the decor image and relief structure can be sized (e, f) to fit the specified surface area. In addition, the preferred panel installation pattern can be specified by the user. The output image of the decor image and relief structure can also be adjusted to fit the specified panel installation pattern. In order to fit the output image of the decor image and relief structure on the surface area and the panel installation pattern, the output image can be cropped, cut, or multiplied. The output image further incorporates extension zones where a base panel can be segmented (i) after printing. After sizing the output image of the décor image can be digitally printed onto a base panel (l). The output image can be printed on a film such as a paper film or a plastic film, more specifically a PVC film. Thereafter, the relief structure can be printed onto the décor image (r). Optionally, the panel is then covered with a protective layer (m). Finally, the base panel can be segmented into multiple individual panels (o). Thereafter, the edges of the individual panels can be processed to provide the panels with interlockable edges (n).

Figure 6:
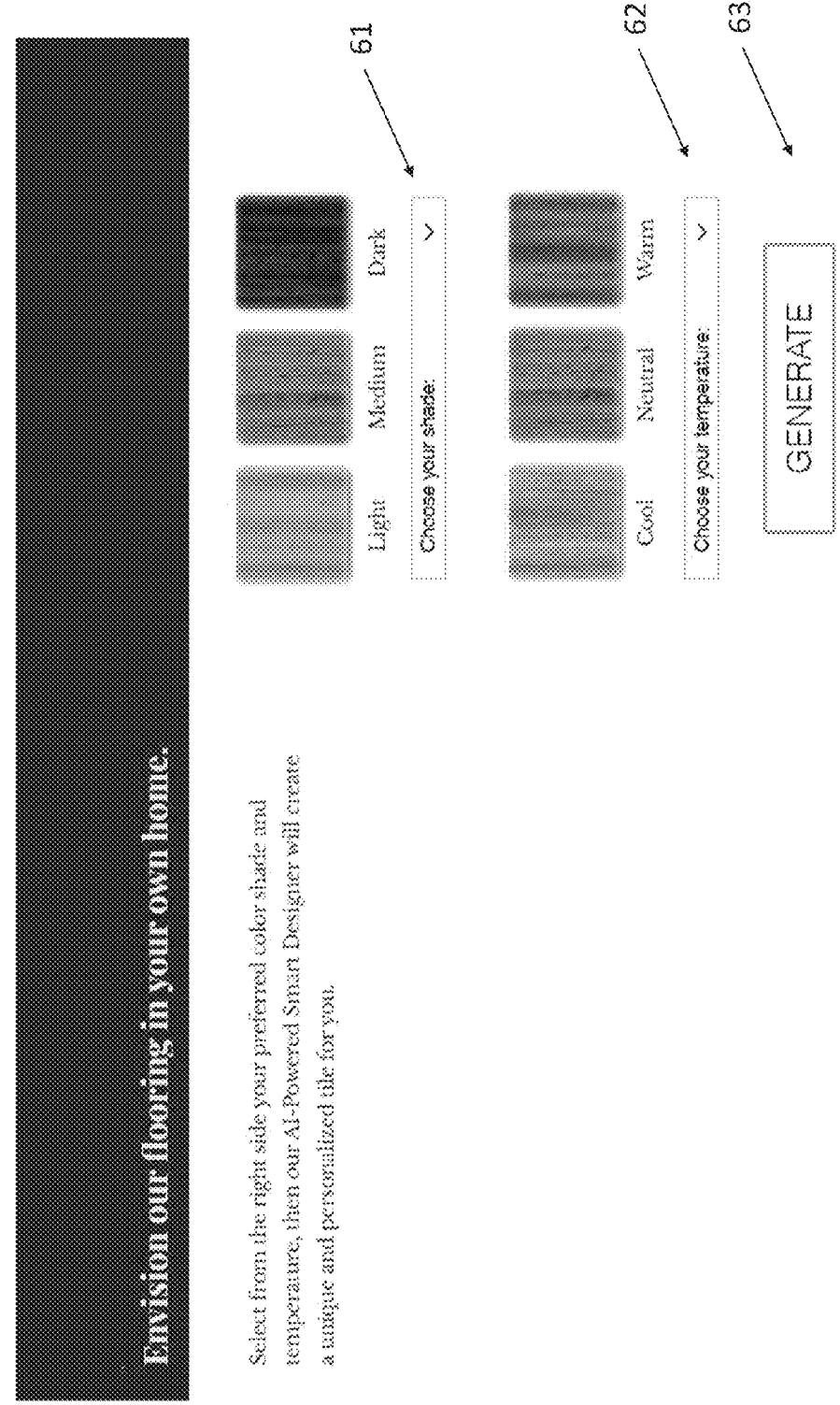
FIG. 6 schematically shows a user interface to select a style preference for a decorative panel according to the invention.

FIG. 6 schematically shows a user interface (60) to select a style preference (61, 62) for a decorative panel. The user interface (60) comprises options for the user to select style preferences. In this embodiment, the user interface comprises two selectable style preferences, namely image shade (61) and image colour temperature (62). In this example, the user can select a preferred image shade by choosing between a light, medium and a dark image shade. It is imaginable that the user can choose from more than three image shades. The user can further select a preferred by choosing between a cool, neutral or a warm colour temperature. It is imaginable that the user can select more than three style preferences in another embodiment, such as a relief structure style preference. After clicking on the generate bottom (63) the GAN generates, from the selected style preferences combined with an input image, a unique and personalized decoration for a decorative panel. In another embodiment, the user can upload a photo to a server to implement a personalized input image to the decorative panel.

Figure 7:
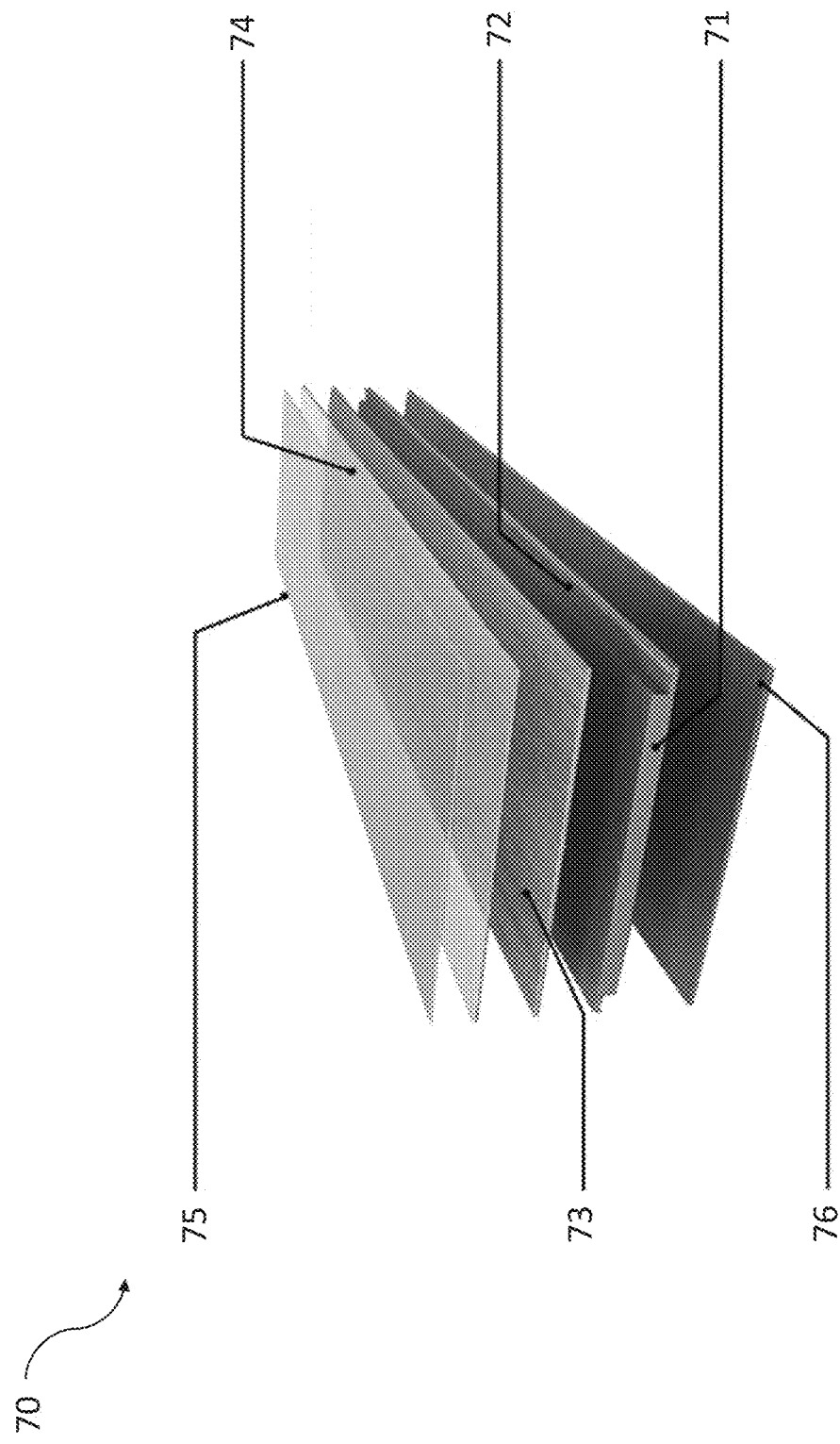
FIG. 7 schematically shows a perspective view of a decorative panel according to the invention.

FIG. 7 schematically shows a perspective view of a decorative panel (70) according to the invention. A decorative panel (70) comprises a core (71) which comprising an upper layer and a lower layer. A decorative layer (73) is, either directly or indirectly, affixed to the upper layer of the core (71). The decorative layer (73) of every decorative panel (70) according to the invention is unique by the GAN generated output image. On top of the decorative layer (73) a protective layer (74) is affixed which covers the decorative layer (73). In addition to the decorative layer (73), the protective layer (74) can comprise a user-selected relief structure which is unique by the GAN generated output image. Optionally, the decorative panel (70) is provided with a UV-coating (75) that is attached to the decorative panel (70) on top of the protective layer (74). Further, a backing layer (76) is, either directly or indirectly, affixed to the lower layer of the core (71). The core (71) further comprises coupling profiles (72) at the panel edges. The coupling profiles (72) enable the locking of decorative panels (70) for the covering of a floor, a wall, a ceiling or furniture.

The above-described inventive concepts are illustrated by several illustrative embodiments.

It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application. It is explicitly emphasized here that all mathematical combinations are possible among the features mentioned above and referred to in the claims as filed, as far as the respectively obtained combination does not include any contradictory characteristics. In this manner, this application thus also forms a reservoir of possibilities of claimed subject-matter.

By "horizontal" is meant a direction which extends parallel to a plane defined by the floor panel, and which may intersect the core. By "vertical" is meant a direction which is perpendicular to said plane defined by the floor panel. The ordinal numbers used in this document, like "first", "second", and "third" are used only for identification purposes. Hence, the use of the expressions "third locking element" and "second locking element" does therefore not necessarily require the co-presence of a "first locking element".

By "complementary" coupling profiles is meant that these coupling profiles can cooperate with each other. However, to this end, the complementary coupling profiles do not necessarily have to have complementary forms. The "floor panel" according to the invention may also applied as wall covering element, ceiling covering element, or alternative covering element. In case in this document reference is made to a "floor tile" or "floor panel", these expressions may be replaced by expressions like "tile", "wall tile", "ceiling tile", "covering tile".

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A computer-implemented method for generating a decorative pattern for decorative panels, such as decorative floor panels, comprising the steps of:
   a) obtaining at least one digital input image for at least one decorative panel,
   b) obtaining a user selection of at least one style preference of at least one style,
   c) applying, by using at least one generative adversarial network (GAN), wherein each GAN is associated with a corresponding style transfer, at least one user selected style preference to said at least one digital input image to generate a digital output image for said at least one decorative panel.

2. The method according to claim 1, wherein during step a) at least one digital input image is selected from an image database which comprises a plurality of scanned wood pattern images.

3. The method according to claim 1, wherein during step a) at least one digital input image is selected by a user.

4. The method according to claim 1, wherein during step a) at least one selected digital base image is uploaded to a server for further processing during step c).

5. The method according to claim 1, wherein during step b) at least one style is chosen from the group consisting of: image shade and image colour temperature.

6. The method according to claim 1, wherein during step b) at least one style preference is obtained by allowing a user to select at least one style preference out of a plurality of, preferably predefined, style options for a specific style.

7. The method according to claim 1, wherein during step b) a plurality of style preferences is obtained, wherein at least one visual related style preference is obtained which is configured to modify the input image obtained during step a), and wherein at least one relief related style preference is obtained which is configured to define a relief structure to be applied, preferably printed, on top of the output image during manufacturing of a decorative panel.

8. The method according to claim 7, wherein the relief related style preference is dependent on the at least one input image and/or on the obtained at least one visual related style preference.

9. The method according to claim 7, wherein the relief related style preference is dependent on the at least one input image and/or on the obtained at least one visual related style preference, such that the relief is at least partially, preferably entirely, in register with the output image.

10. The method according to claim 7, wherein at least one relief related style preference defines at least one grout and/or chamfer to be applied to the decorative panel, preferably at at least one edge of the decorative panel.

11. The method according to claim 7, wherein the relief related style preference is disregarded for generation of the output image during step c).

12. The method according to claim 7, wherein at least one relief related style preference is selected by user.

13. The method according to claim 7, wherein at least one relief related style preference is autonomously generated by at least one GAN.

14. The method according to claim 1, wherein the method comprises step e), comprising obtaining surface area information relating to a surface area to be covered by an assembly of decorative panels, wherein the output image generated during step d) is sized to fit at least said surface area, and preferably is sized to fit a larger surface area than the surface area obtained during step e).

15. The method according to claim 1, wherein the method comprises step f), comprising obtaining a preferred panel size selected and/or defined by a user, wherein the output image generated during step d) is sized to fit at least said panel size, more preferably at least a plurality of said panel sizes, more preferably at least 8 times said panel sizes.

16. The method according to claim 15, wherein the method comprises step g), following step f), comprising the sub steps of:
   i) segmenting the digital input image and/or generated digital output image into a plurality of decorative panel images, wherein each decorative panel image is sized to fit on a decorative panel,
   ii) assigning a positioning code to a decorative panel image for identifying its position in the digital input image and/or generated digital output image, and
   iii) creating a digital layout, such as a staggered or non-staggered layout, of the plurality of decorative panel images,
   iv) storing said positioning codes and said co-related digital layout for the purpose of manufacturing said plurality of decorative panels, and
   v) optionally visualizing the digital layout on a digital screen.

17. The method according to claim 16, wherein at least one, preferably each, decorative panel image includes at least one extension zone, which is configured to be removed from the decorative panel during panel manufacturing, in particular during creation of at least one coupling profile, such as a tongue or groove, at at least one edge of the panel.

18. The method according to claim 16, wherein the method comprises step h), comprising obtaining a preferred panel installation pattern selected by a user, wherein the output image generated during step d) is partially based upon the preferred panel installation pattern obtained during step h).

19. The method for manufacturing of decorative panels, by using the method according to claim 16, comprising the steps of:
   k) applying the computer-implemented method according to any of the foregoing claims to generate at least one digital output image,
   l) printing said at least one output image onto at least one base panel, and
   m) covering said output image with at least one protective layer.

20. The method according to claim 19, wherein at least one protective layer is printed during step m) having a relief structure.

21. The method according to claim 19, wherein the method comprises step n), comprising the step of providing at least one panel edge with at a coupling profile to allow adjacent panels to interconnect.

22. The method according to claim 19, wherein the method comprises step o), comprising dividing the base panel into a plurality of decorative panels, and wherein the digital layout is digitally printed onto the base panel during step l), and wherein during step o) the base panel is divided into a plurality of decorative panels, such that the front side of each decorative panel includes one of the plurality of printed decorative panel images and the backside of each decorative panel preferably includes the positioning code of the decorative panel image printed on the front side of said decorative panel.

23. A non-transitory program storage device (NPSD) comprising computer readable instructions executable by one or more processors to perform the method according to claim 1.

24. A system, comprising:
 one or more processors; and
 one or more non-transitory program storage devices (NPSDs) comprising computer readable instructions executable by the one or more processors to perform the method according to claim 1.

* * * * *